US012776252B2

(12) United States Patent
Li et al.

(10) Patent No.: US 12,776,252 B2
(45) Date of Patent: Oct. 27, 2026

(54) DISPLAY PANEL, DISPLAY DEVICE, AND DISPLAY CONTROL METHOD FOR DRIVING THE WRITING PERIOD OF SUBPIXELS BASED ON GRAYSCALES OF A FRAME

(71) Applicant: Shenzhen China Star Optoelectronics Semiconductor Display Technology Co., Ltd., Shenzhen (CN)

(72) Inventors: Guangyao Li, Shenzhen (CN); Baixiang Han, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 26 days.

(21) Appl. No.: 18/650,271

(22) Filed: Apr. 30, 2024

(65) Prior Publication Data

US 2025/0308434 A1 Oct. 2, 2025

Related U.S. Application Data

(63) Continuation of application No. PCT/CN2024/084659, filed on Mar. 29, 2024.

(30) Foreign Application Priority Data

Mar. 26, 2024 (CN) ......................... 202410348262.0

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01);
(Continued)

(58) Field of Classification Search
None
See application file for complete search history.

(56) References Cited

U.S. PATENT DOCUMENTS 11,232,747 B2 * 1/2022 Li ........................ G09G 3/3233
2010/0039458 A1 * 2/2010 Nathan ................ G09G 3/3258 345/698

(Continued)

FOREIGN PATENT DOCUMENTS

CN 103474023 A 12/2013
CN 104680978 A 6/2015

(Continued)

OTHER PUBLICATIONS

Chinese Office Action issued in corresponding Chinese Patent Application No. 202410348262.0 dated May 7, 2024, pp. 1-7.

(Continued)

*Primary Examiner* — Sarvesh J Nadkarni
(74) *Attorney, Agent, or Firm* — PV IP PC; Peter Stecher; Wei Te Chung

(57) ABSTRACT

A display panel, a display control method and a display device are provided. A sub-pixel receives a data signal of a first level during a data writing period. The data signal has a second level during a first period, and has a third level during a second period. An absolute value of a difference between a third voltage corresponding to the third level and a first voltage corresponding to the first level is less than an absolute value of a difference between a second voltage corresponding to the second level and the first voltage.

14 Claims, 6 Drawing Sheets

(52) U.S. Cl.
CPC . *G09G 2310/0275* (2013.01); *G09G 2310/08* (2013.01); *G09G 2320/0209* (2013.01)

(56) References Cited

U.S. PATENT DOCUMENTS

| | | | | |
|---|---|---|---|---|
| 2016/0155395 | A1* | 6/2016 | Park | G09G 3/3648 345/100 |
| 2016/0224157 | A1* | 8/2016 | Yang | G06F 3/04184 |
| 2017/0221419 | A1* | 8/2017 | Xiang | G09G 3/3233 |
| 2017/0278462 | A1* | 9/2017 | Li | G09G 3/3266 |
| 2018/0342217 | A1* | 11/2018 | Kim | G09G 3/3688 |
| 2019/0206316 | A1 | 7/2019 | Park et al. | |
| 2021/0358413 | A1* | 11/2021 | Chen | G09G 3/3233 |
| 2023/0386391 | A1* | 11/2023 | Li | G09G 3/3233 |
| 2024/0071321 | A1* | 2/2024 | Lu | G09G 3/3291 |

FOREIGN PATENT DOCUMENTS

| | | | |
|---|---|---|---|
| CN | 106782332 | A | 5/2017 |
| CN | 109074777 | A | 12/2018 |
| CN | 114582286 | A | 6/2022 |
| CN | 114783342 | A | 7/2022 |
| CN | 115831048 | A | 3/2023 |
| CN | 115881029 | A | 3/2023 |
| EP | 3327713 | A1 | 5/2018 |
| JP | 2017134425 | A | 8/2017 |
| KR | 100649238 | B1 | 11/2006 |

OTHER PUBLICATIONS

International Search Report in International application No. PCT/CN2024/084659, mailed on Dec. 11, 2024.

Written Opinion of the International Search Authority in International application No. PCT/CN2024/084659, mailed on Dec. 11, 2024.

* cited by examiner

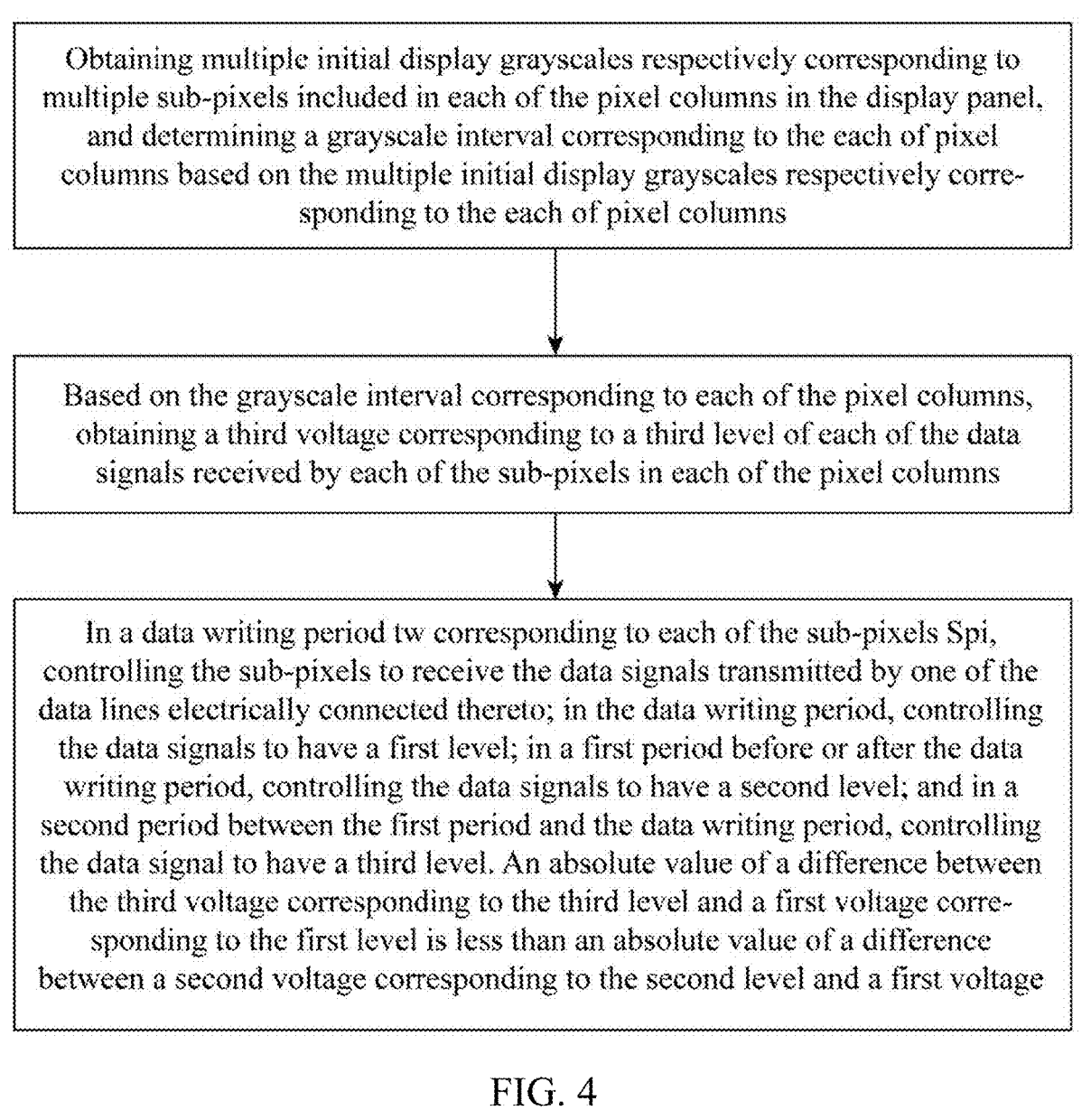

Obtaining multiple initial display grayscales respectively corresponding to multiple sub-pixels included in each of the pixel columns in the display panel, and determining a grayscale interval corresponding to the each of pixel columns based on the multiple initial display grayscales respectively corresponding to the each of pixel columns

↓

Based on the grayscale interval corresponding to each of the pixel columns, obtaining a third voltage corresponding to a third level of each of the data signals received by each of the sub-pixels in each of the pixel columns

↓

In a data writing period tw corresponding to each of the sub-pixels Spi, controlling the sub-pixels to receive the data signals transmitted by one of the data lines electrically connected thereto; in the data writing period, controlling the data signals to have a first level; in a first period before or after the data writing period, controlling the data signals to have a second level; and in a second period between the first period and the data writing period, controlling the data signal to have a third level. An absolute value of a difference between the third voltage corresponding to the third level and a first voltage corresponding to the first level is less than an absolute value of a difference between a second voltage corresponding to the second level and a first voltage

FIG. 4

DISPLAY PANEL, DISPLAY DEVICE, AND DISPLAY CONTROL METHOD FOR DRIVING THE WRITING PERIOD OF SUBPIXELS BASED ON GRAYSCALES OF A FRAME

CROSS-REFERENCE TO RELATED APPLICATIONS

This application is a continuation application of International Application No. PCT/CN2024/084659, filed on Mar. 29, 2024, which claims priority to Chinese Application No. 202410348262.0, filed on Mar. 26, 2024. The disclosures of the above applications are incorporated herein by reference in their entireties.

TECHNICAL FIELD

The present disclosure relates to display technologies, in particular to a display panel, a display control method and a display device.

BACKGROUND

Compared with a low resolution display panel, a medium/high resolution display panel with the same size as the low resolution display panel has a smaller spacing between pixels, and thus has greater signal interference between pixels and is prone to a crosstalk problem.

SUMMARY

According to one or more embodiments of the present disclosure, a display panel includes: multiple scan lines configured to transmit a plurality of scan signals; multiple data lines configured to transmit a plurality of data signals; and multiple sub-pixels electrically connected to the scan lines and the data lines and configured to receive the data signals based on the scan signals in a data writing period. The data signals have a first level in the data writing period, the data signals have a second level in a first period before or after the data writing period, the data signals have a third level in a second period between the first period and the data writing period, and an absolute value of a difference between a third voltage corresponding to the third level and a first voltage corresponding to the first level is less than an absolute value of a difference between a second voltage corresponding to the second level and the first voltage.

According to one or more embodiments of the present disclosure, a display control method is applied to a display panel including multiple data lines configured to transmit multiple data signals; and multiple sub-pixels electrically connected to the data lines and configured to receive the data signals in a data writing period. The data signals have a first level in the data writing period, the data signals have a second level in a first period before or after the data writing period, the data signals have a third level in a second period between the first period and the data writing period, and an absolute value of a difference between a third voltage corresponding to the third level and a first voltage corresponding to the first level is less than an absolute value of a difference between a second voltage corresponding to the second level and the first voltage. The display panel includes multiple pixel columns, and ones of the sub-pixels included in each of the pixel columns are all electrically connected to one of the data lines. The method includes: obtaining multiple initial display grayscales respectively corresponding to the ones of the sub-pixels, and determining a grayscale interval corresponding to the each of the pixel columns based on the plurality of initial display grayscales; based on the grayscale interval, obtaining the third voltage; and controlling the each of the ones of the sub-pixels to receive the each of the ones of the data signals in the data writing period, controlling the each of the ones of the data signals to have the first level in the data writing period, controlling the each of the ones of the data signals to have the second level in the first period, and controlling the each of the ones of the data signals to have the third level in the second period.

According to one or more embodiments of the present disclosure, a display device includes the above-mentioned display panel.

BRIEF DESCRIPTION OF THE DRAWINGS

FIG. 4 is a flowchart of a display control method according to one or more embodiments of the present disclosure.

DETAILED DESCRIPTION

Figure 1:
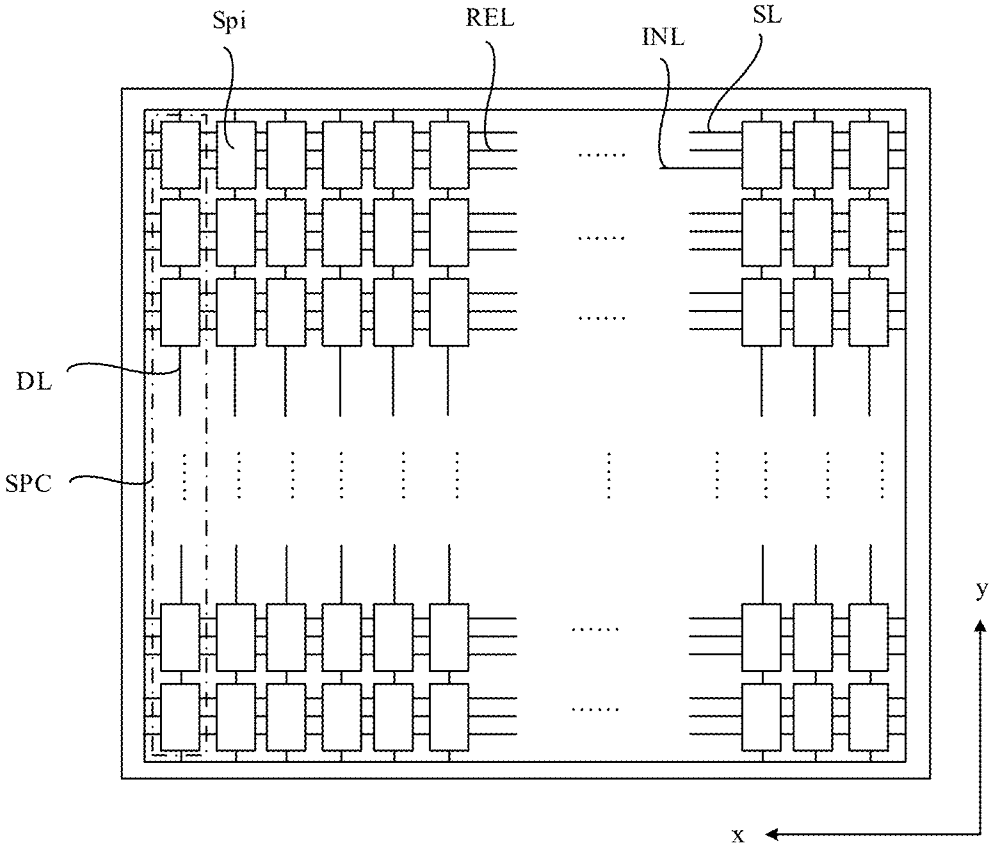
FIG. 1 is a schematic diagram of a structure of a display panel according to one or more embodiments of the present disclosure.

Some embodiments of the present disclosure will be described in detail below with reference to the drawings. The embodiments are described for illustrative purposes only and are not intended to limit the present disclosure.

Optionally, in one or more embodiments, a display panel includes multiple pixel columns, and each of the pixel columns includes multiple sub-pixels electrically connected to the same data line. In one frame, multiple sub-pixels of the same pixel column correspondingly have multiple initial display grayscales, and a median value of a voltage corresponding to a maximum display grayscale among the multiple initial display grayscales and a voltage corresponding to a minimum display grayscale among the multiple initial display grayscales is an intermediate voltage. The absolute value of the difference between a third voltage and a second voltage is less than or equal to the intermediate voltage.

Optionally, in one or more embodiments of the present disclosure, the absolute value of the difference between the second voltage and a first voltage is greater than or equal to the intermediate voltage, and the third voltage is equal to the intermediate voltage.

Optionally, in one or more embodiments of the present disclosure, the absolute value of the difference between the second voltage and the first voltage is less than the intermediate voltage, and the absolute value of the difference between the third voltage and the second voltage is less than the intermediate voltage.

Optionally, in one or more embodiments of the present disclosure, the third voltage is equal to 0.5 times of the absolute value of the difference between the first voltage and the second voltage.

Optionally, in one or more embodiments of the present disclosure, a length of a data writing period is less than or equal to a length of the second period.

Optionally, in one or more embodiments of the present disclosure, each of the sub-pixels includes a light-emitting device, a drive transistor, a switch transistor, and a first capacitor. The input terminal of the drive transistor is electrically connected to a first power supply terminal, the output terminal of the drive transistor is electrically connected to the light-emitting device, the control terminal of the switch transistor is electrically connected to a corresponding scan line, the input terminal of the switch transistor is electrically connected to a corresponding data line, the output terminal of the switch transistor is electrically connected to the control terminal of the drive transistor. The first terminal of the first capacitor is electrically connected to the control terminal of the drive transistor, and the second terminal of the first capacitor is electrically connected to the output terminal of the drive transistor.

Optionally, in one or more embodiments of the present disclosure, at least one of the sub-pixels further includes a reset transistor and a compensation transistor. The control terminal of the reset transistor is configured to receive a reset control signal, the input terminal of the reset transistor is configured to receive a reset signal, and the output terminal of the reset transistor is electrically connected to the light-emitting device. The control terminal of the compensation transistor is configured to receive a compensation control signal, the input terminal of the compensation transistor is configured to receive a compensation signal, and the output terminal of the compensation transistor is electrically connected to the control terminal of the drive transistor.

According to a display panel, a display control method thereof and a display device according to one or more embodiments of the present disclosure, the sub-pixels included in the display panel in a data writing period receive data signals with a first level based on scan signals, so as to write the data signals into the sub-pixels. Each of the data signals has a second level in a first period before or after the data writing period and has a third level in a second period between the first period and the data writing period, the absolute value of the difference between a third voltage corresponding to the third level and a first voltage corresponding to the first level is less than the absolute value of the difference between a second voltage corresponding to the second level and the first voltage. So that the coupling effect caused by the jump voltage difference between the third voltage and the first voltage through a parasitic capacitance is less than the coupling effect caused by the jump voltage difference between the second voltage and the first voltage through a parasitic capacitance, thereby improving a display problem that the voltage jump voltage difference is large when the data signals directly jumps between the first voltage and the second voltage, and the coupling effect is serious after coupling by a parasitic capacitance, the signal quality is affected and crosstalk occurs on the display panel.

Specifically, FIG. 1 is a schematic diagram of a structure of a display panel according to one or more embodiments of the present disclosure. According to one or more embodiments of the present disclosure, a display panel includes multiple scan lines SL, multiple data lines DL and multiple sub-pixels Spi.

The multiple scan lines SL are configured to transmit multiple scan signals Ga. Optionally, each of the scan lines SL extends in a first direction x, and the multiple scan lines SL are arranged in a second direction y.

The multiple data lines DL are configured to transmit multiple data signals Vda. Optionally, each of the data lines DL extends in the second direction y, and the multiple data lines DL are arranged in the first direction x.

The multiple sub-pixels Spi are electrically connected to the multiple scan lines SL and the multiple data lines DL, and the multiple sub-pixels Spi are displayed based on corresponding scan signals Ga and data signals Vda.

Optionally, each of the sub-pixels Spi includes a light-emitting device Di and a pixel drive circuit electrically connected to the light-emitting device Di and configured to drive a corresponding light-emitting device Di to emit light.

Optionally, each of the sub-pixels Spi includes at least one light-emitting device Di. The light-emitting device Di includes one of an organic light-emitting diode, a submillimeter light-emitting diode, a micro light-emitting diode, and the like.

Figure 2:
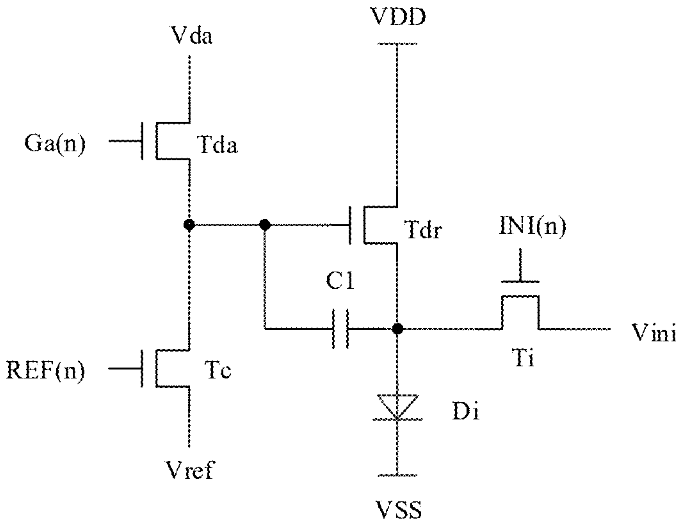
FIG. 2 is a schematic diagram of a structure of a sub-pixel according to one or more embodiments of the present disclosure.

FIG. 2 is a schematic diagram of a structure of a sub-pixel according to one or more embodiments of the present disclosure. The pixel drive circuit of each of the sub-pixels Spi includes a drive transistor Tdr, a switch transistor Tda, and a first capacitor C1.

The input terminal of the drive transistor Tdr is electrically connected to a first power supply terminal VDD, the output terminal of the drive transistor Tdr is electrically connected to the light-emitting device Di, and the drive transistor Tdr is configured to generate a drive current that drives the light-emitting device Di to emit light.

The control terminal of the switch transistor Tda is electrically connected to a corresponding scan line SL, the input terminal of the switch transistor Tda is electrically connected to a corresponding data line DL, the output terminal of the switch transistor Tda is electrically connected to the control terminal of the drive transistor Tdr, and the switch transistor Tda is configured to control signal transmission between the control terminal of the drive transistor Tdr and the data lines DL based on the scan signals Ga.

The first terminal of the first capacitor C1 is electrically connected to the control terminal of the drive transistor Tdr, and the second terminal of the first capacitor C1 is electrically connected to the output terminal of the drive transistor Tdr.

The anode of the light-emitting device Di is electrically connected to the output terminal of the drive transistor Tdr, and the cathode of the light-emitting device Di is electrically connected to a second power supply terminal VSS.

Referring to FIG. 2, in one or more embodiments of the present disclosure, at least one of the sub-pixels Spi further includes a reset transistor Ti and a compensation transistor Tc.

The control terminal of the reset transistor Ti is configured to receive a reset control signal INI, the input terminal of the reset transistor Ti is configured to receive a reset signal Vini, the output terminal of the reset transistor Ti is electrically connected to the light-emitting device Di, and the reset transistor Ti is configured to transmit the reset signal Vini to the anode of the light-emitting device Di based on the reset control signal INI to reset the anode potential of the light-emitting device Di.

The control terminal of the compensation transistor Tc is configured to receive a compensation control signal REF, the input terminal of the compensation transistor Tc is configured to receive a compensation signal Vref, the output terminal of the compensation transistor Tc is electrically connected to the control terminal of the drive transistor Tdr, and the compensation transistor Tc is configured to transmit the compensation signal Vref to the control terminal of the drive transistor Tdr based on the compensation control signal REF.

Accordingly, referring to FIG. 1, the display panel may include multiple reset control lines INL configured to transmit multiple reset control signals INI and multiple compensation control lines REL configured to transmit multiple compensation control signals REF. The reset transistor Ti is configured to transmit the reset signal Vini to the anode of the light-emitting device Di based on a corresponding reset control signal INI, and the compensation transistor Tc of each of the sub-pixels Spi is configured to transmit the compensation signal Vref to the control terminal of the drive transistor Tdr based on a corresponding compensation control signal REF.

Optionally, the display panel includes a first gate drive unit configured to generate the multiple scan signals Ga for transmission to the multiple sub-pixels Spi through the multiple scan lines SL. The effective pulses of the multiple scan signals Ga have the same pulse width.

Optionally, the display panel includes a second gate drive unit configured to generate the multiple reset control signals INI for transmission to the multiple sub-pixels Spi through the multiple reset control lines INL.

Optionally, in one or more embodiments of the present disclosure, the second gate drive unit is further configured to generate the multiple compensation control signals REF for transmission to the multiple sub-pixels Spi through the multiple compensation control lines REL.

Optionally, in one or more embodiments of the present disclosure, the display panel includes a third gate drive unit configured to generate the multiple compensation control signals REF for transmission to the multiple sub-pixels Spi through the multiple compensation control lines REL.

It is understandable that the circuit structure of the pixel drive circuit is not limited to the form shown in FIG. 2, but also may be configured in the form of 5T1C, 7T1C, 8T2C, and the like. XTYC indicates that the pixel drive circuit includes X transistors and Y capacitors.

However, there is a parasitic capacitance between a data line DL and the control terminal of the drive transistor Tdr of an adjacent one of the sub-pixels Spi, and the parasitic capacitance is large when the display panel adopts a high-resolution design, so that when the data signals Vda change, the control terminal potentials of the drive transistors Tdr of the different rows of sub-pixels Spi will be coupled in varying degrees, and then the data signals Vda will interfere with the scan signals Ga. Thus, some of the sub-pixels Spi cannot accurately receive the required data signals Vda, resulting in a problem of display crosstalk on the display panel and the like.

Therefore, in order to improve the display crosstalk problem, according to one or more embodiments of the present disclosure, the changes of the data signals Vda are adjusted. That is, the sub-pixels Spi are configured to receive the data signals Vda transmitted by the electrically connected data lines DL based on the scan signals Ga in a data writing period tw. Each of the data signals Vda has the first level in the data writing period tw, has the second level in the first period ta before or after the data writing period tw, and has the third level in the second period tb between the first period ta and the data writing period tw. The absolute value of the difference between the third voltage V3 corresponding to the third level and the first voltage V1 corresponding to the first level is less than the absolute value of the difference between the second voltage V2 corresponding to the second level and the first voltage V1, so that the coupling effect caused by the jump voltage difference between the third voltage V3 and the first voltage V1 through the parasitic capacitance is less than the coupling effect caused by the jump voltage difference between the second voltage V2 and the first voltage V1 through the parasitic capacitance, thereby improving a display problem that the voltage jump voltage difference is large when the data signals Vda directly jump between the first voltage V1 and the second voltage V2, and the coupling effect is serious after coupling by a parasitic capacitance, the signal quality is affected and vertical display crosstalk occurs on the display panel.

Note that the data writing period tw is a phase in which each of the data signals Vda is transmitted to the control terminal of the drive transistor Tdr when each of the scan signals Ga received by each of the sub-pixels Spi has a high level.

Figure 3A:
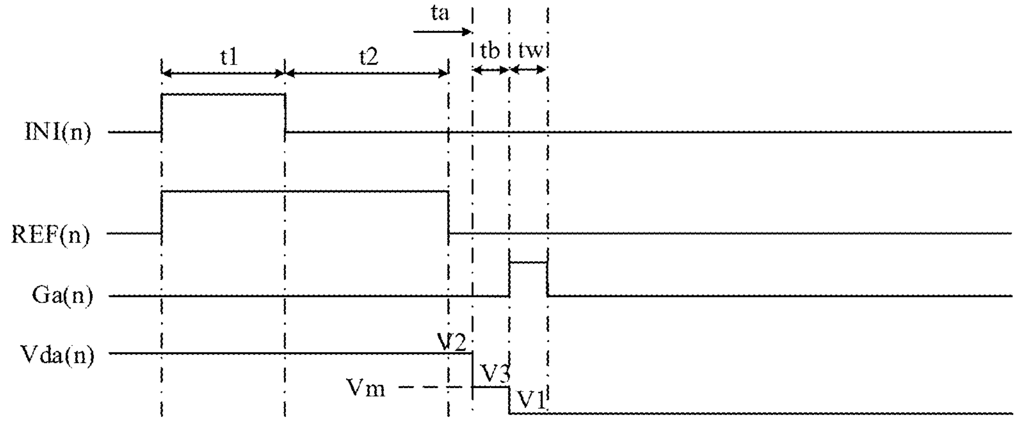
FIG. 3A is a timing diagram of a pixel drive circuit according to one or more embodiments of the present disclosure.

FIG. 3A is a timing diagram of a pixel drive circuit according to one or more of embodiments of the present disclosure, An example is taken to explain the working principle of the pixel drive circuit, in which the drive transistor Tdr, the switch transistor Tda, the compensation transistor Tc, and the reset transistor Ti are all N-type transistors, each of the scan signals Ga used by the sub-pixels Spi corresponds to the n-th scan signal Ga(n) among the multiple scan signals, one of the reset control signals INI used by each of the sub-pixels Spi corresponds to the n-th reset control signal INI(n) among the multiple reset control signals, each of the compensation control signals REF used by the sub-pixels Spi corresponds to the n-th compensation control signal REF(n) among the multiple compensation control signals, and each of the data signals Vda applied by the sub-pixels Spi corresponds to the n-th data signal Vda(n) among the multiple data signals.

In an initialization phase t1, both the n-th compensation control signal REF(n) and the n-th reset control signal INI(n) have a high level, and the n-th scan signal Ga(n) has a low level. The compensation transistor Tc and the reset transistor Ti are turned on, the anode potential of the light-emitting device Di is reset by the reset signal Vini, and the compensation signal Vref is transmitted to the control terminal of the drive transistor Tdr.

In a compensation phase t2, the n-th compensation control signal REF(n) has a high level, and both the n-th reset control signal INI(n) and the n-th scan signal Ga(n) have a low level. The reset transistor Ti is turned off, and the compensation transistor Tc maintains turned on.

In the data writing period tw, both the n-th compensation control signal REF(n) and the n-th reset control signal INI(n) have a low level, and the n-th scan signal Ga(n) has a high level. The compensation transistor Tc and the reset transistor Ti are turned off, the switch transistor Tda is turned on, the data signal Vda is transmitted to the control terminal of the drive transistor Tdr, and the drive transistor Tdr generates a drive current based on the corresponding data signal Vda to drive the light-emitting device Di to emit light.

By controlling the voltage value of the data signal Vda in the data writing period tw, the magnitude of the drive current generated by the drive transistor Tdr may be controlled, thereby controlling the brightness of the light-emitting device Di.

In FIG. 3A, the first period ta is before the data writing period tw. Optionally, the first period ta may partially coincide with the initialization phase t1 and the compensation phase t2 on a timeline.

Figure 3B:
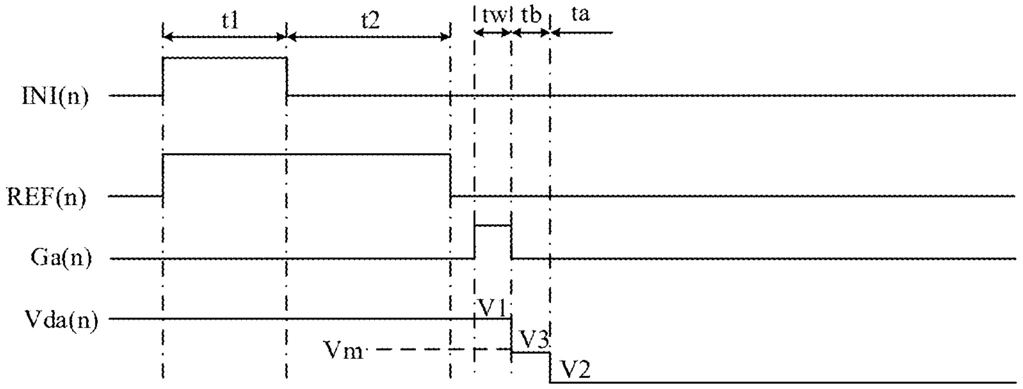
FIG. 3B is another timing diagram of a pixel drive circuit according to one or more embodiments of the present disclosure.

FIG. 3B is another timing diagram of a pixel drive circuit according to one or more embodiments of the present disclosure, in which the first period ta is after the data writing period tw.

Since each of the data lines DL is electrically connected to multiple sub-pixels Spi located in the same column, voltage jumps of the data signals Vda will affect the control terminal of the drive transistor Tdr of each of the sub-pixels Spi located in the same column in varying degrees. Therefore, in order to comprehensively compensate for the influence of the coupling effect caused by the voltage jumps of the data signals Vda on the multiple sub-pixels Spi located in the same column, the third voltage V3 may be set based on the voltage corresponding to the initial display grayscale corresponding to multiple sub-pixels Spi electrically connected to the same data line DL.

Further referring to FIG. 1, the display panel includes multiple pixel columns SPC, each of which includes multiple sub-pixels Spi electrically connected to the same data line DL. Then, the third voltage V3 may be set based on the voltage corresponding to the initial display grayscale corresponding to multiple sub-pixels Spi located in the same pixel column SPC.

Since the display screen corresponding to each of the pixel columns SPC is different in each frame, the initial display grayscale corresponding to the multiple sub-pixels Spi of each of the pixel columns SPC is also different. Accordingly, the data signals Vda needed by the multiple sub-pixels Spi of each of the pixel columns SPC have different voltages, resulting in different coupling effects. Therefore, in order to compensate for the influence of coupling effects under different display screens, the third voltage V3 may be set based on voltages corresponding to a maximum display grayscale and a minimum display grayscale among the multiple initial display grayscales corresponding to the pixel column SPC.

Optionally, in one or more embodiments of the present disclosure, in one frame, the multiple sub-pixels Spi of the same pixel column SPC have multiple initial display grayscales, and a median value of a voltage corresponding to a maximum display grayscale among the multiple initial display grayscales and a voltage corresponding to a minimum display grayscale among the multiple initial display grayscales is an intermediate voltage Vm. In a case that the voltage corresponding to the maximum display grayscale among the multiple initial display grayscales is Vmax, and the voltage corresponding to the minimum display grayscale among the multiple initial display grayscales is Vmin, the intermediate voltage Vm is equal to Vmin+ (Vmax−Vmin)/2.

Optionally, in one or more embodiments of the present disclosure, the voltage corresponding to the intermediate display grayscale of the maximum display grayscale and the minimum display grayscale of the multiple initial display grayscales is the intermediate voltage Vm. In a case that the maximum display grayscale value is 200 and the minimum display grayscale value is 20, the intermediate display grayscale value is 110, and the voltage corresponding to minimum display grayscale value is the intermediate voltage Vm.

The absolute value of the difference between the third voltage V3 and the second voltage V2 is less than or equal to the intermediate voltage Vm, so that the influence of the coupling effects under different display screens are compensated.

For example, in one frame, as for a certain pixel column SPC, the maximum display grayscale value is 255, and the minimum display grayscale value is 0. As for another pixel column SPC, the maximum display grayscale value is 200, and the minimum display grayscale value is 30. Then, the intermediate voltage Vm obtained based on the voltage corresponding to 255 and 0 is different from the intermediate voltage Vm obtained based on the voltage corresponding to 200 and 30. The value range of the third voltage V3 adopted by the pixel column SPC with the maximum display grayscale value of 255 and the minimum display grayscale value of 0 may be different from the value range of the third voltage V3 adopted by the pixel column SPC with the maximum display grayscale of value 200 and the minimum display grayscale value of 30.

Further, each of the pixel columns SPC display different screens for different frames, thus the corresponding maximum display grayscale and minimum display grayscale may be different. Therefore, the third voltage V3 is set based on the voltages corresponding to the maximum display grayscale and the minimum display grayscale corresponding to each of the pixel columns SPC, and the corresponding third voltage V3 can be matched for each of the pixel columns SPC in different frames, so that the influence of the coupling effect generated by each of the pixel columns SPC in each of the frames based on the actual display content can be compensated.

The greater the jump voltage differences of the data signals Vda, the more significant the influence of the coupling effect caused by the parasitic capacitance. The smaller the jump voltage differences of the data signals Vda, the smaller the influence of the coupling effect caused by the parasitic capacitance. If the voltage difference between the third voltage V3 and the second voltage V2 is set to be greater than the voltage difference between the first voltage V1 and the second voltage V2, the coupling effect caused by the jumps of the data signals Vda between the third voltage V3 and the second voltage V2 is greater than the coupling effect caused by the jumps of the data signals Vda between the second voltage V2 and the first voltage V1, thereby increasing the influence of the coupling effect. Thus, the third voltage V3 may be determined based on the relationship between the absolute value of the difference between the first voltage V1 and the second voltage V2 and the intermediate voltage Vm, so that the data signals Vda have a small jump voltage difference.

Accordingly, in one or more embodiments of the present disclosure, the absolute value of the difference between the second voltage V2 and the first voltage V1 is greater than or equal to the intermediate voltage Vm, and the third voltage V3 is equal to the intermediate voltage Vm, so that the absolute value of the difference between the third voltage V3 and the first voltage V1 is less than the absolute value of the difference between the second voltage V2 and the first voltage V1.

Referring to FIG. 3A, the first period ta is located before the data writing period tw, and the second voltage V2 is a voltage corresponding to a high display grayscale value (e.g., 240, etc.), and the first voltage V1 is a voltage corresponding a low display grayscale value (e.g., 20, etc.). Thus, when the absolute value of the difference between the second voltage V2 and the first voltage V1 is greater than or equal to the intermediate voltage Vm, the third voltage V3 may be set to be equal to the intermediate voltage Vm for the second period tb, and the data signal Vda may be set to have the first voltage V1 for the data writing period tw. The data signal Vda forms a trapezoidal change trend in the first period ta, the second period tb, and the data writing period tw.

Similarly, referring to FIG. 3B, the first period ta is located after the data writing period tw, the second voltage V2 is a voltage corresponding to a low display grayscale value, and the first voltage V1 is a voltage corresponding to a high display grayscale value. Thus, when the absolute value of the difference between the second voltage V2 and the first voltage V1 is greater than or equal to the intermediate voltage Vm, the third voltage V3 may be set to be equal to the intermediate voltage Vm for the second period tb, and the data signal Vda may be set to have the first voltage V1 for the data writing period tw.

Figure 3C:
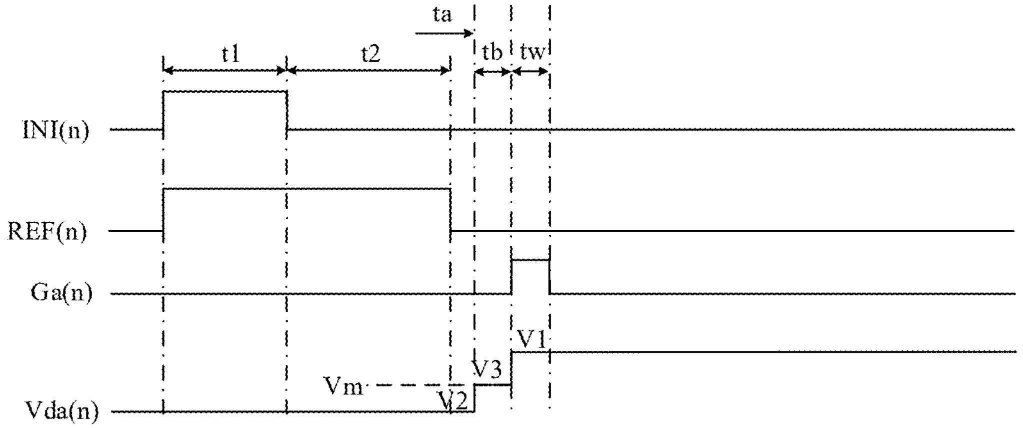
FIG. 3C is yet another timing diagram of a pixel drive circuit according to one or more embodiments of the present disclosure.

Similarly, FIG. 3C is another timing diagram of a pixel drive circuit according to one or more embodiments of the present disclosure. The first period ta is located before the data writing period tw, and the second voltage V2 is a voltage corresponding to a low display grayscale value, and the first voltage V1 is a voltage of corresponding to a high display grayscale value. Thus, when the absolute value of the difference between the second voltage V2 and the first voltage V1 is greater than or equal to the intermediate voltage Vm, the third voltage V3 can be set to be equal to the intermediate voltage Vm for the second period tb, and the data signal Vda can be set to have the first voltage V1 in the data writing period tw.

Figure 3D:
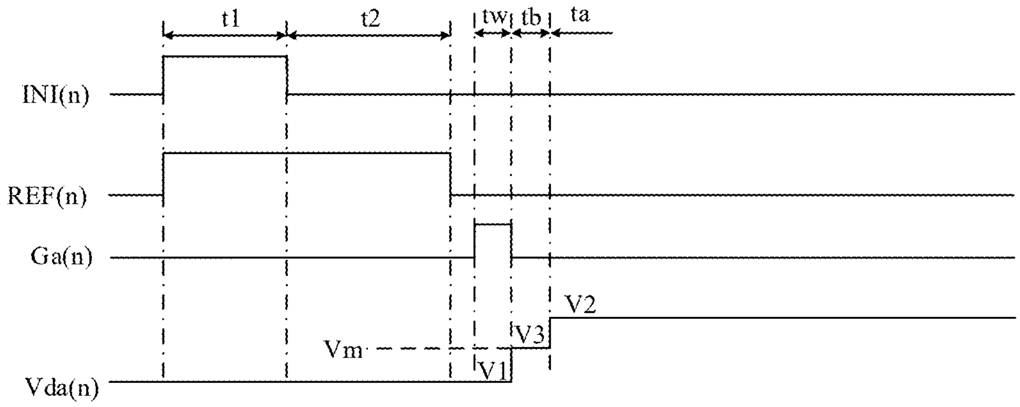
FIG. 3D is yet another timing diagram of a pixel drive circuit according to one or more embodiments of the present disclosure.

Similarly, FIG. 3D is another timing diagram of a pixel drive circuit according to one or more embodiments of the present disclosure. The first period ta is located after the data writing period tw, the second voltage V2 is a voltage corresponding to a high display grayscale value, and the first voltage V1 is a voltage corresponding to low display grayscale value. Thus, when the absolute value of the difference between the second voltage V2 and the first voltage V1 is greater than or equal to the intermediate voltage Vm, the third voltage V3 can be set to be equal to the intermediate voltage Vm for the second period tb, and the data signal Vda can be set to have the first voltage V1 for the data writing period tw.

In one or more embodiments of the present disclosure, the absolute value of the difference between the second voltage V2 and the first voltage V1 is less than the intermediate voltage Vm, and the absolute value of the difference between the third voltage V3 and the second voltage V2 is less than the intermediate voltage Vm, so that the absolute value of the difference between the third voltage V3 and the first voltage V1 is less than the absolute value of the difference between the second voltage V2 and the first voltage V1.

Optionally, in one or more embodiments of the present disclosure, when the absolute value of the difference between the second voltage V2 and the first voltage V1 is less than the intermediate voltage Vm, the third voltage V3 is equal to 0.5 times of the absolute value of the difference between the first voltage V1 and the second voltage V2, so that the third voltage V3 is the median value of the first voltage V1 and the second voltage V2.

Figure 3E:
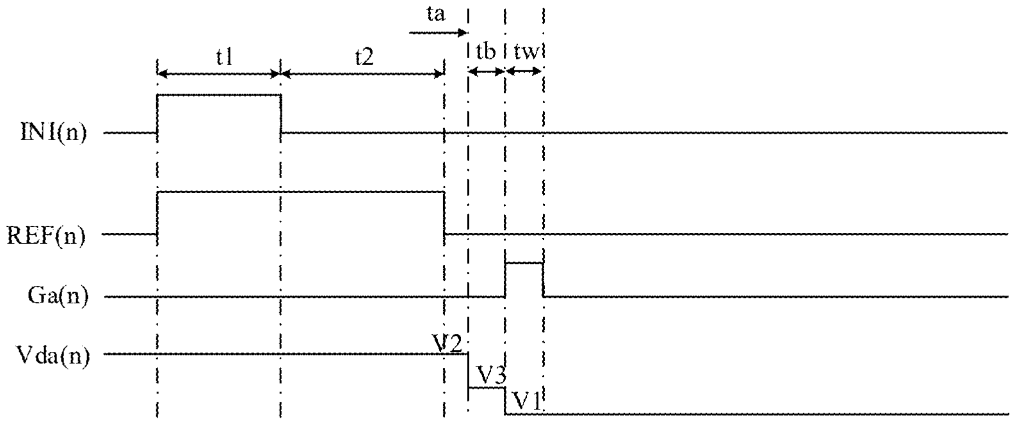
FIG. 3E is yet another timing diagram of a pixel drive circuit according to one or more embodiments of the present disclosure.

FIG. 3E is another timing diagram of a pixel drive circuit according to one or more embodiments of the present disclosure. The first period ta is located before the data writing period tw, the second voltage V2 is a voltage corresponding to a high display grayscale value, and the first voltage V1 is a voltage corresponding to a low display grayscale value. Thus, when the absolute value of the difference between the second voltage V2 and the first voltage V1 is less than the intermediate voltage Vm, the third voltage V3 can be set to be equal to 0.5 times of the absolute value of the difference between the first voltage V1 and the second voltage V2 for the second period tb, and the data signal Vda can be set to have the first voltage V1 for the data writing period tw.

Figure 3F:
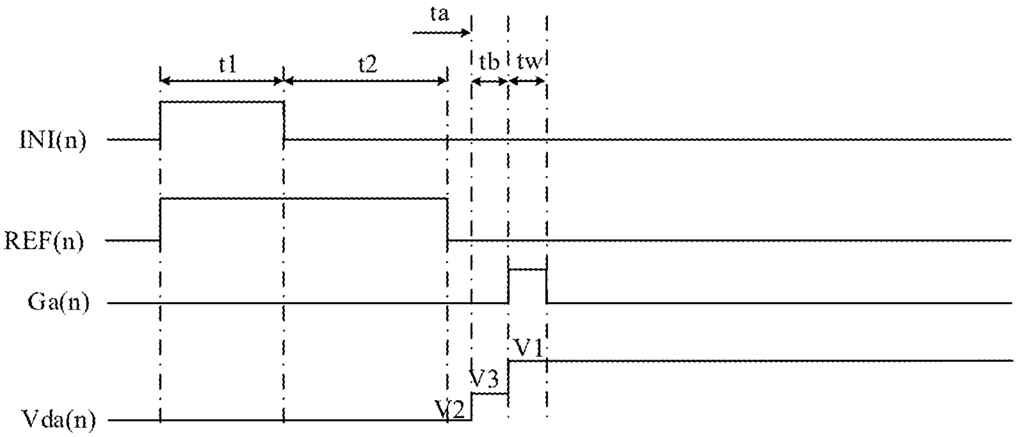
FIG. 3F is yet another timing diagram of a pixel drive circuit according to one or more embodiments of the present disclosure.

Similarly, FIG. 3F is another timing diagram of a pixel drive circuit according to one or more embodiments of the present disclosure. The first period ta is located before the data writing period tw, the second voltage V2 is a voltage corresponding to a low display grayscale value, and the first voltage V1 is a voltage corresponding to a high display grayscale value. Thus, when the absolute value of the difference between the second voltage V2 and the first voltage V1 is less than the intermediate voltage Vm, the third voltage V3 can be set to be equal to 0.5 times of the absolute value of the difference between the first voltage V1 and the second voltage V2 for the second period tb, and the data signal Vda can be made to have the first voltage V1 for the data writing period tw.

Figure 3G:
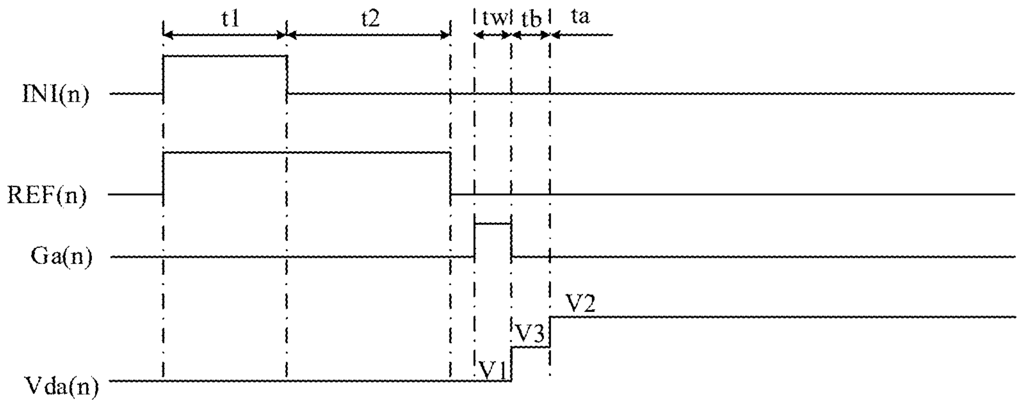
FIG. 3G is yet another timing diagram of a pixel drive circuit according to one or more embodiments of the present disclosure.

Similarly, FIG. 3G is another timing diagram of a pixel drive circuit according to one or more embodiments of the present disclosure. The first period ta is located after the data writing period tw, the second voltage V2 is a voltage corresponding to a high display grayscale value, and the first voltage V1 is a voltage corresponding to a low display grayscale value. Thus, when the absolute value of the difference between the second voltage V2 and the first voltage V1 is less than the intermediate voltage Vm, the third voltage V3 can be set to be equal to 0.5 times of the absolute value of the difference between the first voltage V1 and the second voltage V2 for the second period tb, and the data signal Vda can be set to have the first voltage V1 for the data writing period tw.

Figure 3H:
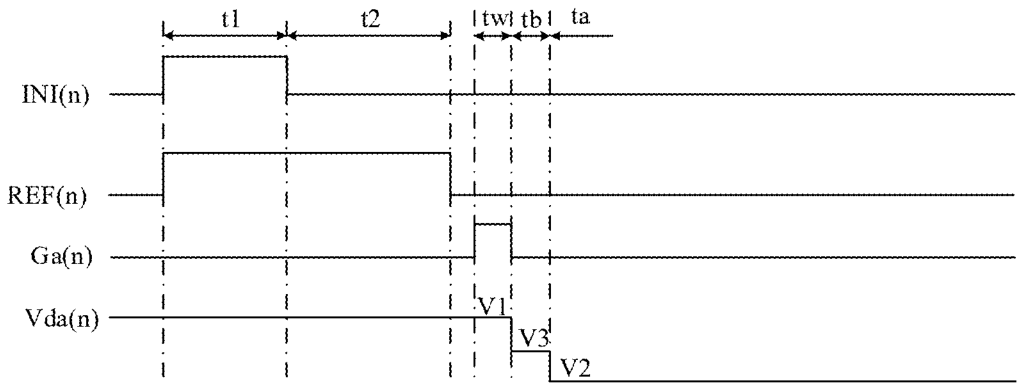
FIG. 3H is yet another timing diagram of a pixel drive circuit according to one or more embodiments of the present disclosure.

Similarly, FIG. 3H is another timing diagram of a pixel drive circuit according to one or more embodiments of the present disclosure. The first period ta is located after the data writing period tw, the second voltage V2 is a voltage corresponding to a low display grayscale value, and the first voltage V1 is a voltage corresponding to a high display grayscale value. Thus, when the absolute value of the difference between the second voltage V2 and the first voltage V1 is less than the intermediate voltage Vm, the third voltage V3 can be set to be equal to 0.5 times of the absolute value of the difference between the first voltage V1 and the second voltage V2 for the second period tb, and the data signal Vda can be set to have the first voltage V1 for the data writing period tw.

In order to prevent the data signals Vda having the third level from being received by the sub-pixels Spi and affecting the display effect of the sub-pixels Spi, the time length of the data writing period tw may be adjusted. For example, the time length of the data writing period tw is adjusted from 1H to less than 1H. H represents a unit time length, which is set by the control device.

Optionally, the time length of the data writing period tw may be shortened by controlling the pulse widths of the effective pulses of the scan signals Ga received by the sub-pixels Spi. That is, each of the pulse widths of the effective pulses of the scan signals Ga is reduced, so that the time length of the data writing period tw is reduced.

Accordingly, when the data signals Vda received by the sub-pixels Spi have a third level, the scan signals Ga received by the sub-pixels Spi have an invalid level. When the data signals Vda received by the sub-pixels Spi have a first level, the scan signals Ga received by the sub-pixels Spi have an effective level, so that the pulse widths of the effective pulses of the scan signals Ga can be reduced. For example, when the data signals Vda received by the sub-pixels Spi have a third level, the scan signals Ga received by the sub-pixels Spi have a low level. When the data signals Vda received by the sub-pixels Spi have a first level, the scan signals Ga received by the sub-pixels Spi have a high level.

Optionally, in one or more embodiments of the present disclosure, the time length of the data writing period tw is less than or equal to the time length of the second period tb, so that the data signals Vda needed by the sub-pixels Spi are normally written into the sub-pixels Spi, and the influence of the coupling effect caused by the voltage jumps of the data signals Vda is also compensated.

Optionally, in one or more embodiments of the present disclosure, the pulse width corresponding to the data writing period tw is 0.3 H to 0.5 H, so that the data signals Vda needed by the sub-pixels Spi are normally written, ensuring the sub-pixels Spi have a good charging rate, and also compensating for the influence of the coupling effect caused by the voltage jumps of the data signals Vda.

It can be understood that each of the sub-pixels Spi is matched with a corresponding first period ta, a corresponding second period tb, and a corresponding data writing period tw due to a phase difference between the effective pulses output by the multiple scan signals Ga.

Optionally, in one or more embodiments of the present disclosure, the multiple sub-pixels Spi includes a first sub-pixel and a second sub-pixel which are adjacent in the second direction y and electrically connected to a same one of the data lines DL. The data writing period tw corresponding to the first sub-pixel is ahead of the data writing period tw corresponding to the second sub-pixel.

When the first period ta corresponding to each of the sub-pixels Spi is before the corresponding data writing period tw, the second voltage V2 of one of the data signals Vda received by the second sub-pixel in the corresponding first period ta may be equal to the first voltage V1 of one of the data signals Vda received by the first sub-pixel in the corresponding data writing period tw.

When the first period ta corresponding to each of the sub-pixels Spi is located after the corresponding data writing period tw, the second voltage V2 of one of the data signals Vda received by the first sub-pixel in the corresponding first period ta may be equal to the first voltage V1 of one of the data signals Vda received by the second sub-pixel in the corresponding data writing period tw.

In one or more embodiments of the present disclosure, the data signals Vda recovers to a reference voltage during a blanking interval period, and the second voltage V2 each of the data signals Vda during the first period ta may be equal to the reference voltage.

When the second voltage V2 is equal to the reference voltage, the third voltage V3 may still be determined based on the absolute value of the difference between the first voltage V1 and the second voltage V2. That is, when the absolute value of the difference between the second voltage V2 and the first voltage V1 is greater than or equal to the intermediate voltage Vm, the third voltage V3 may still be set to be equal to the intermediate voltage Vm. When the absolute value of the difference between the second voltage V2 and the first voltage V1 is less than the intermediate voltage Vm, the third voltage V3 may still be set to be equal to 0.5 times the absolute value of the difference between the first voltage V1 and the second voltage V2.

Optionally, the blanking interval period includes at least one of a horizontal blanking interval period and a vertical blanking interval period.

Optionally, in one or more embodiments of the present disclosure, after the intermediate voltage Vm corresponding to each of the pixel columns SPC is determined, the third voltage V3 corresponding to each of the pixel columns SPC may be directly set to be the intermediate voltage Vm, so that the third voltage V3 corresponding to the sub-pixels Spi in each of the pixel columns SPC are all the same, thereby compensating for the influence of the coupling effect caused by the voltage jumps of the data signals Vda to a certain extent while reducing control difficulty and power consumption.

According to one or more embodiments of the present disclosure, by controlling the voltage change of the data signals Vda, the coupling effect of ones of the sub-pixels Spi receiving ones of the data signals Vda to the control terminal of the drive transistor Tdr of each of an adjacent row of sub-pixels Spi is reduced, thereby reducing the coupling effect of all the sub-pixels Spi in the display panel to the control terminal of the drive transistor Tdr of each of the adjacent row of sub-pixels Spi, and further improving the vertical crosstalk problem.

Optionally, the third voltage V3 corresponding to each of different display requirements may be stored in a storage module in advance, so that when the levels of the data signals Vda required by each of the pixel columns SPC need to be controlled, the required third voltage V3 is directly called by a control device, thereby saving the display control time.

Optionally, in one or more embodiments of the present disclosure, the grayscale range corresponding to each of the pixel columns SPC may be determined based on multiple initial display grayscales corresponding to each of the pixel columns SPC, and then the intermediate voltage Vm and the third voltage V3 are determined.

FIG. 4 is a flowchart of a display control method according to one or more embodiments of the present disclosure. The display control method may include:

obtaining multiple initial display grayscales respectively corresponding to multiple sub-pixels Spi included in each of the pixel columns SPC in the display panel, and determining a grayscale interval corresponding to the each of pixel columns SPC based on the multiple initial display grayscales respectively corresponding to the each of pixel columns SPC;

based on the grayscale interval corresponding to each of the pixel columns SPC, obtaining the third voltage V3 corresponding to the third level of each of the data signals Vda received by each of the sub-pixels Spi in each of the pixel columns SPC; and in the data writing period tw corresponding to each of the sub-pixels Spi, controlling the sub-pixels Spi to receive the data signals Vda transmitted by one of the data lines DL electrically connected thereto, and in the data writing period tw, controlling each of the data signals Vda to have a first level; in the first period ta before or after the data writing period tw, controlling each of the data signals Vda to have a second level; and in the second period tb between the first period ta and the data writing period tw, controlling the data signal Vda to have the third level. The absolute value of the difference between the third voltage V3 corresponding to the third level and the first voltage V1 corresponding to the first level is less than the absolute value of the difference between the second voltage V2 corresponding to the second level and the first voltage V1.

Optionally, the determining of the grayscale interval corresponding to the each of pixel column SPC based on the multiple initial display grayscales respectively corresponding to the each of pixel columns SPC includes: determining the grayscale interval corresponding to the each of pixel columns SPC based on the maximum display grayscale and the minimum display grayscale among the multiple initial display grayscales corresponding to each of the pixel columns SPC.

Since each of the pixel columns SPC corresponds to different display screens and may have different maximum display grayscales and minimum display grayscales, the grayscale ranges corresponding to each of the grayscale intervals are different. For example, the grayscale range may correspond to 0 to 255, and may also correspond to 1 to 255, 2 to 255, and the like. Optionally, the grayscale range corresponding to the grayscale interval corresponding to each of the pixel columns SPC is X to Y. X is the minimum display grayscale corresponding to each of the pixel columns SPC, and Y is the maximum display grayscale corresponding to each of the pixel columns SPC.

Optionally, the grayscale range corresponding to each of the grayscale intervals may be set during a debugging phase.

Optionally, in the debugging phase, the grayscale range may be set to 0 to 255, 32 to 255, and the like. Based on the fact that brightness data corresponds to each of the pixel columns SPC in the display panel under different grayscale intervals, a crosstalk test method is used to perform data measurement, and the brightness difference under the crosstalk problem is calculated. After that, the intermediate voltage Vm corresponding to each of the different grayscale intervals is set, the third voltage V3 corresponding to each of the different grayscale ranges is obtained, and the intermediate voltage Vm and the third voltage V3 set are verified and optimized. In a case that the crosstalk test standard is met when the intermediate voltage Vm and the third voltage V3 corresponding to each of the different grayscale intervals are applied to display together with the sub-pixels Spi, the intermediate voltage Vm and the third voltage V3 that meet the crosstalk test standard are stored in a storage module, so as to facilitate the call of needed data when the control device executes the display control method in actual use.

During the optimization of the intermediate voltage Vm and the third voltage V3, the change of the intermediate voltage Vm and the third voltage V3 will cause the change of the display brightness. Therefore, in order to make the display brightness tend to be consistent with the target brightness after the intermediate voltage Vm and the third voltage V3 change, when the intermediate voltage Vm and the third voltage V3 change, the voltage corresponding to the initial display grayscale of the multiple sub-pixels Spi may be controlled to also change. Accordingly, in actual use, the first voltage V1 and the second voltage V2 of each of the data signals Vda may be voltages obtained by compensating the voltage corresponding to the initial display grayscale of each of the sub-pixels Spi (that is, the change that satisfies the test requirement in the change made to the voltage corresponding to the initial display grayscale in the debugging phase is recorded, so that in actual use, the needed first voltage V1 and the second voltage V2 are obtained by calling the corresponding change amount based on the initial display grayscale).

Optionally, the pulse widths of the second period tb and the data writing period tw may be controlled to increase or decrease from 0.5 H during the optimization of the intermediate voltage Vm and the third voltage V3.

Optionally, after debugging the intermediate voltage Vm and the third voltage V3 corresponding to one grayscale interval, the intermediate voltage Vm and the third voltage V3 corresponding to another grayscale interval may be debugged.

Optionally, the intermediate voltage Vm and the third voltage V3 corresponding to each of the multiple grayscale intervals may be different.

Figure 5:
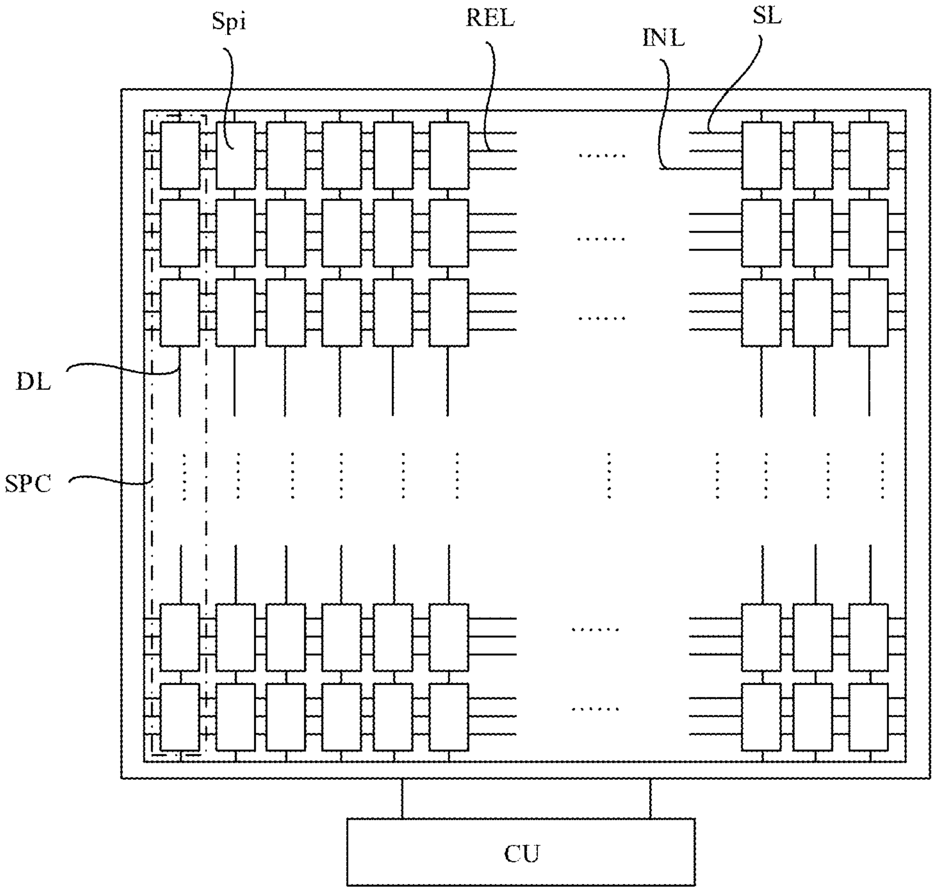
FIG. 5 is a schematic diagram of a structure of a display device according to one or more embodiments of the present disclosure.

FIG. 5 is a schematic diagram of the structure of a display device according to one or more embodiments of the present disclosure. The display device includes the above display panel.

Optionally, the display device further includes a control module CU and a storage module which are electrically connected to the display panel. The control module CU is configured to control the display panel to display, and the storage module is configured to store the intermediate voltage Vm and the third voltage V3 corresponding to each of the different grayscale intervals.

Optionally, the control module CU includes a timing controller, a microprocessor, a central processor, and the like. The storage module includes volatile and non-volatile memories.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A display panel, comprising:

a plurality of scan lines configured to respectively transmit a plurality of scan signals;

a plurality of data lines configured to respectively transmit a plurality of data signals; and a plurality of sub-pixels, each of the sub-pixels being electrically connected to one of the scan lines and one of the data lines and being configured to, during a data writing period, receive one of the data signals transmitted by the one of the data lines based on one of the scan signals transmitted by the one of the scan lines, wherein the one of the data signals has a first level during the data writing period, has a second level during a first period before or after the data writing period, and has a third level during a second period between the first period and the data writing period;

a first absolute value of a difference between a third voltage corresponding to the third level and a first voltage corresponding to the first level is less than a second absolute value of a difference between a second voltage corresponding to the second level and the first voltage;

the sub-pixels are arranged in a plurality of pixel columns, and each of the pixel columns comprises ones of the sub-pixels electrically connected to one of the data lines; and the ones of the sub-pixels respectively have a plurality of initial display grayscales in a frame, a median value of a voltage corresponding to a maximum display grayscale among the initial display grayscales and a voltage corresponding to a minimum display grayscale among the initial display grayscales is taken as an intermediate voltage, and a third absolute value of a difference between the third voltage and the second voltage is less than or equal to the intermediate voltage.

2. The display panel according to claim 1, wherein the second absolute value is greater than or equal to the intermediate voltage, and the third voltage is equal to the intermediate voltage.

3. The display panel according to claim 1, wherein the second absolute value is less than the intermediate voltage, and the third absolute value is less than the intermediate voltage.

4. The display panel according to claim 3, wherein the third voltage is equal to 0.5 times of the second absolute value.

5. The display panel according to claim 1, wherein a length of the data writing period is less than or equal to a length of the second period.

6. The display panel according to claim 1, wherein each of the sub-pixels comprises:

a light-emitting device;

a drive transistor having an input terminal electrically connected to a first power supply terminal, and an output terminal electrically connected to the light-emitting device;

a switch transistor having a control terminal electrically connected to one of the scan lines, an input terminal electrically connected to one of the data lines, and an output terminal electrically connected to a control terminal of the drive transistor; and a first capacitor having a first terminal electrically connected to the control terminal of the drive transistor, and a second terminal electrically connected to the output terminal of the drive transistor.

7. The display panel according to claim 6, wherein at least one of the sub-pixels further comprises:

a reset transistor having a control terminal configured to receive a reset control signal, an input terminal configured to receive a reset signal, and an output terminal electrically connected to the light-emitting device; and a compensation transistor having a control terminal configured to receive a compensation control signal, an input terminal configured to receive a compensation signal, and an output terminal electrically connected to the control terminal of the drive transistor.

8. A display control method for a display panel, wherein the display panel comprises:

a plurality of scan lines configured to respectively transmit a plurality of scan signals;

a plurality of data lines configured to respectively transmit a plurality of data signals; and a plurality of sub-pixels electrically connected to the plurality of scan lines and the plurality of data lines, the sub-pixels being arranged in a plurality of pixel columns, each of the pixel columns comprising ones of the sub-pixels electrically connected to one of the data lines, the method comprising:

obtaining a plurality of initial display grayscales respectively corresponding to the ones of the sub-pixels in a frame, and determining a grayscale interval corresponding to the each of the pixel columns based on the plurality of initial display grayscales;

obtaining, based on the grayscale interval, a third voltage when one of the data signals transmitted by the one of the data lines and received by the ones of the sub-pixels has a third level; and controlling each of the ones of the sub-pixels to receive the one of the data signals during a data writing period, and controlling the one of the data signals to have a first level during the data writing period, have a second level during a first period before or after the data writing period, and have the third level during a second period between the first period and the data writing period, wherein a first absolute value of a difference between the third voltage corresponding to the third level and a first voltage corresponding to the first level is less than a second absolute value of a difference between a second voltage corresponding to the second level and the first voltage;

a median value of a voltage corresponding to a maximum display grayscale among the initial display grayscales and a voltage corresponding to a minimum display grayscale among the initial display grayscales is taken as an intermediate voltage, and a third absolute value of a difference between the third voltage and the second voltage is less than or equal to the intermediate voltage.

9. A display device, comprising:

a display panel; and a control module electrically connected to the display panel and configured to control the display panel to display, wherein the display panel comprises:

a plurality of scan lines configured to respectively transmit a plurality of scan signals;

a plurality of data lines configured to respectively transmit a plurality of data signals; and a plurality of sub-pixels, each of the sub-pixels being electrically connected to one of the scan lines one of the data lines and being configured to, during a data writing period, receive one of the data signals transmitted by the one of the data lines based on one of the scan signals transmitted by the one of the scan lines, wherein the one of the data signals has a first level during the data writing period, has a second level during a first period before or after the data writing period, and has a third level during a second period between the first period and the data writing period;

a first absolute value of a difference between a third voltage corresponding to the third level and a first voltage corresponding to the first level is less than a second absolute value of a difference between a second voltage corresponding to the second level and the first voltage;

the sub-pixels are arranged in a plurality of pixel columns, and each of the pixel columns comprises ones of the sub-pixels electrically connected to one of the data lines; and the ones of the sub-pixels respectively have a plurality of initial display grayscales in a frame, a median value of a voltage corresponding to a maximum display grayscale among the initial display grayscales and a voltage corresponding to a minimum display grayscale among the initial display grayscales is taken as an intermediate voltage, and a third absolute value of a difference between the third voltage and the second voltage is less than or equal to the intermediate voltage.

10. The display device according to claim 9, wherein the second absolute value is greater than or equal to the intermediate voltage, and the third voltage is equal to the intermediate voltage.

11. The display device according to claim 9, wherein the second absolute value is less than the intermediate voltage, and the third absolute value is less than the intermediate voltage.

12. The display device according to claim 11, wherein the third voltage is equal to 0.5 times of the second absolute value.

13. The display device according to claim 9, further comprising a storage module electrically connected to the display panel and configured to store the intermediate voltage and the third voltage.

14. The display device according to claim 9, wherein a length of the data writing period is less than or equal to a length of the second period.

* * * * *